United States Patent
Takemoto

(10) Patent No.: US 8,108,604 B2
(45) Date of Patent: Jan. 31, 2012

(54) DISK ARRAY SYSTEM

(75) Inventor: Takashi Takemoto, Tokyo (JP)

(73) Assignee: NEC Corporation, Tokyo (JP)

( * ) Notice: Subject to any disclaimer, the term of this patent is extended or adjusted under 35 U.S.C. 154(b) by 347 days.

(21) Appl. No.: 12/400,960

(22) Filed: Mar. 10, 2009

(65) Prior Publication Data

US 2009/0228652 A1    Sep. 10, 2009

(30) Foreign Application Priority Data

Mar. 10, 2008    (JP) .................................. 2008-060234

(51) Int. Cl.
*G06F 12/02* (2006.01)
(52) U.S. Cl. ......... 711/114; 711/100; 711/112; 711/154
(58) Field of Classification Search .................. 711/100, 711/112, 114, 154
See application file for complete search history.

(56) References Cited

U.S. PATENT DOCUMENTS

2006/0059408 A1\* 3/2006 Chikusa et al. ............... 714/770

FOREIGN PATENT DOCUMENTS

JP    2007086941 A    4/2007

\* cited by examiner

*Primary Examiner* — Jasmine Song

(57) ABSTRACT

A disk array system comprises plural disk array devices, and each disk array device has two disk array controllers (first DAC and second DAC) for controlling a disk array. In each disk array device, the first DAC has a redundant configuration with a second DAC of any one of the other disk array devices. Likewise, in each disk array device, the second DAC has a redundant configuration with a first DAC of any one of the other disk array devices. Accordingly, because of the failure of a backboard or the like, even if the first DAC and second DAC of a disk array device become inoperative, when their partners in the redundant configurations are operative, the function as the DAC is maintained. Therefore, it is possible to replace a disk array device or the backboard thereof without terminating the operation of the disk array system.

2 Claims, 6 Drawing Sheets

CONVENTIONAL TECHNOLOGY

DISK ARRAY SYSTEM

This application is based on Japanese Patent Application No. 2008-060234 filed on Mar. 10, 2008, and including specification, claims, drawings and summary. The disclosure of the above Japanese Patent Application is incorporated herein by reference in its entirety.

BACKGROUND OF THE INVENTION

1. Field of the Invention

The present invention relates to a disk array system, and more particularly, a disk array system that enables replacement of a disk array device without terminating operation.

2. Description of the Related Art

There is known a disk array system comprising plural disk array devices each having two disk array controllers (DACs). According to such a disk array system, the two DACs in each disk array device generally has a redundant configuration (see, for example, Unexamined Japanese Patent Application KOKAI Publication No. 2007-086941).

Accordingly, as shown in FIG. 6, when, for example, the backboard of a disk array device 10-(N−2) breaks down so that it becomes necessary to replace the disk array device 10-(N−2), it is necessary to terminate operation of the disk array system, because both DACs 12A-(N−2) and 12B-(N−2) become inoperative.

In other words, it is impossible to replace the disk array device 10-(N−2) while the disk array system is in operation.

SUMMARY OF THE INVENTION

The present invention has been made in view of the foregoing circumstance, and it is an object of the present invention to provide a disk array system that enables replacement of a disk array device without terminating operation.

To achieve the object, a disk array system according to the first aspect of the present invention comprises a plurality of disk array devices each having plural disk array controllers for controlling writing and reading of data to plural disk devices constituting a disk array, wherein a disk array controller of a first disk array device in the plurality of disk array devices and a disk array controller of a second disk array device different from the first disk array device have a redundant configuration.

Moreover, a disk array system according to the second aspect of the present invention comprises a plurality of disk array devices each having two disk array controllers for controlling a disk array, wherein in each disk array device, each disk array controller has a redundant configuration with either one of the disk array controllers of any one of the plurality of disk array devices.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENT

An explanation will be given of a disk array system according to an embodiment of the present invention.

Figure 1:
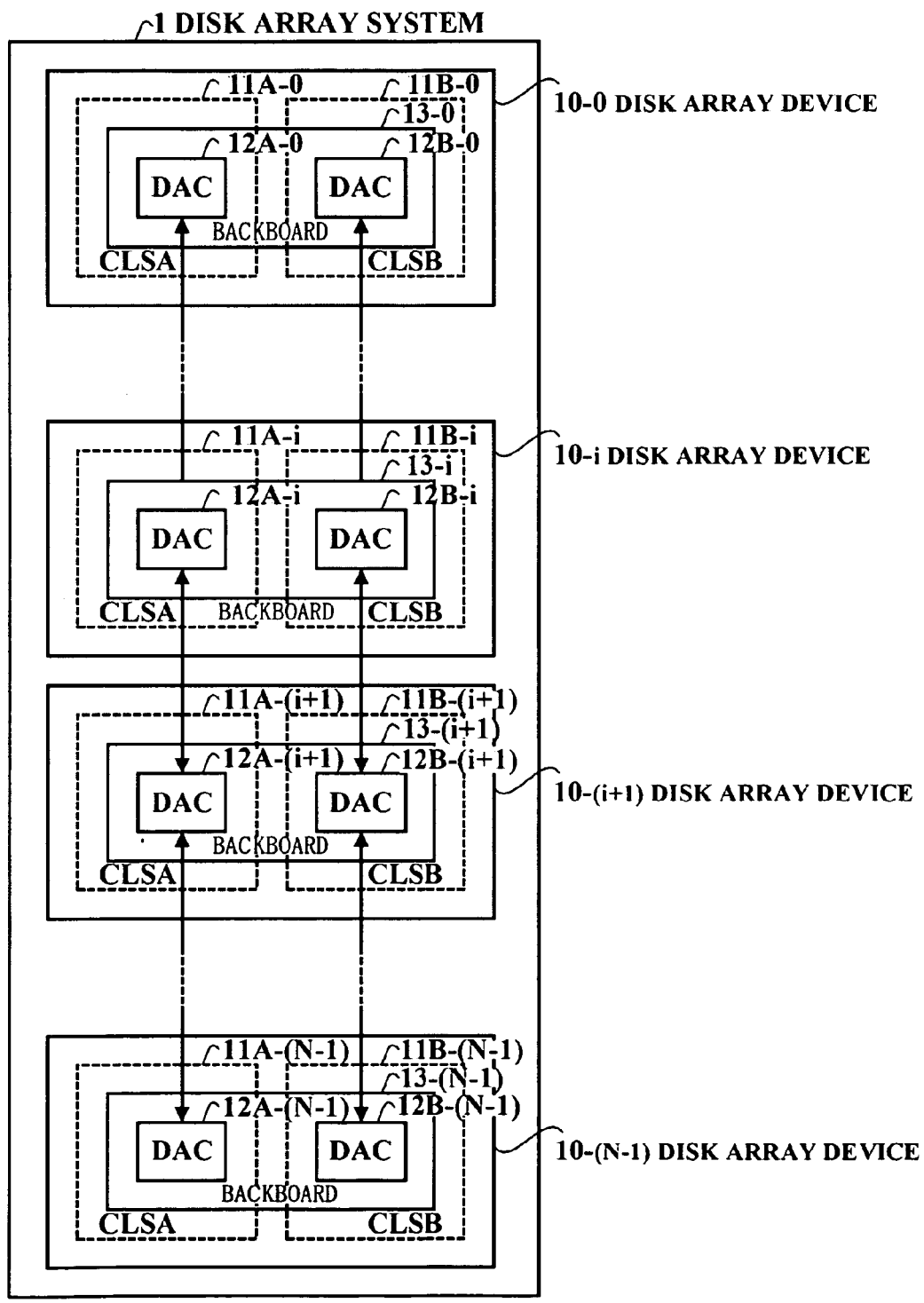
FIG. 1 is a block diagram showing the configuration example (No. 1) of a disk array system according to an embodiment of the present invention.

As shown in FIG. 1, a disk array system 1 of the embodiment roughly comprises N number (N is an integer greater than or equal to two) of disk array devices 10-$i$ ($0 \leq i \leq N-1$). The disk array device 10-$i$ has a cluster A (CLSA) 11A-$i$ and a cluster B (CLSB) 11B-$i$.

The CLSA 11A-$i$ and CLSB 11B-$i$ are defined as a unit operating as a disk array controller (DAC). In the embodiment, a DAC 12A-$i$ is correspondingly provided for the CLSA 11A-$i$, and a DAC 12B-$i$ is correspondingly provided for the CLSB 11B-$i$.

The DAC 12A-$i$ and DAC 12B-$i$ are individually connected via a path or the like to a non-illustrated host device or non-illustrated plural disk devices that constitute a disk array so as to communicate one another. For example, the DAC 12A-$i$ and DAC 12B-$i$ receive a write request from a host device, and, disperse and store data sent forward from the host device via a path in each disk device. Moreover, the DAC 12A-$i$ and DAC 12B-$i$ receive a read request from the host device, read out data from each disk device, and send forward the data to the host device via the path.

The DAC 12A-$i$ and the DAC 12B-$i$ are connected together via a backboard 13-$i$ so as to communicate with each other. The DAC 12A-$i$ has two ports for connecting cables, and is connected to a DAC 12A-($i$−1) and a DAC 12A-($i$+1) via the cables so as to mutually communicate with each other. Likewise, the DAC 12B-$i$ also has two ports for connecting cables, and is connected to a DAC 12B-($i$−1) and a DAC 12B-($i$+1) via the cables so as to mutually communicate with each other.

Note that the DAC 12A-($i$+1) and the DAC 12B-$i$ are not directly connected together via a backboard, a cable, etc. However, as explained above, the DAC 12A-$i$ and the DAC 12B-$i$ are connected together via the backboard 13-$i$, and the DAC 12B-$i$ and the DAC 12B-($i$+1) are connected together via the cable. Accordingly, the DAC 12A-($i$+1) and the DAC 12B-$i$ can mutually communicate with each other through the DAC 12A-$i$ or the DAC 12B-($i$+1).

The same is true for all DACs which can communicate one another. For example, a DAC 12A-0 and a DAC 12B-(N−1) are not directly connected together via a backboard, a cable, etc., but can mutually communicate with each other.

In the embodiment, the DAC 12A-($i$+1) and the DAC 12B-$i$ have a RAID (Redundant Array of Independent Disks) 1 redundant configuration, and the DAC 12A-0 and the DAC 12B-(N−1) have a RAID 1 redundant configuration.

Accordingly, even if either one of the DAC 12A-($i$+1) or the DAC 12B-$i$ becomes inoperative, no interruption for operating the disk array system 1 occurs. Moreover, even if either one of the DAC 12A-0 or the DAC 12B-(N−1) becomes inoperative, no interruption for operating the disk array system 1 occurs.

In the disk array system 1 having the foregoing configuration, when a disk array device 10-$i$ is replaced, both DAC 12A-$i$ and DAC 12B-$i$ become inoperative. However, if both DAC 12B-($i$−1) and DAC 12A-($i$+1) are operative, it is not necessary to terminate the operation of the disk array system 1. That is, when a disk array device 10-($i$−1) and a disk array device 10-($i$+1) are operative, it is possible to replace a disk array device 10-$i$ without terminating the operation of the disk array system 1.

Next, regarding the effect of the foregoing disk array system 1, an explanation will be given in detail for a case where the disk array system 1 has three disk array devices 10-0 to 10-2.

Figure 2:
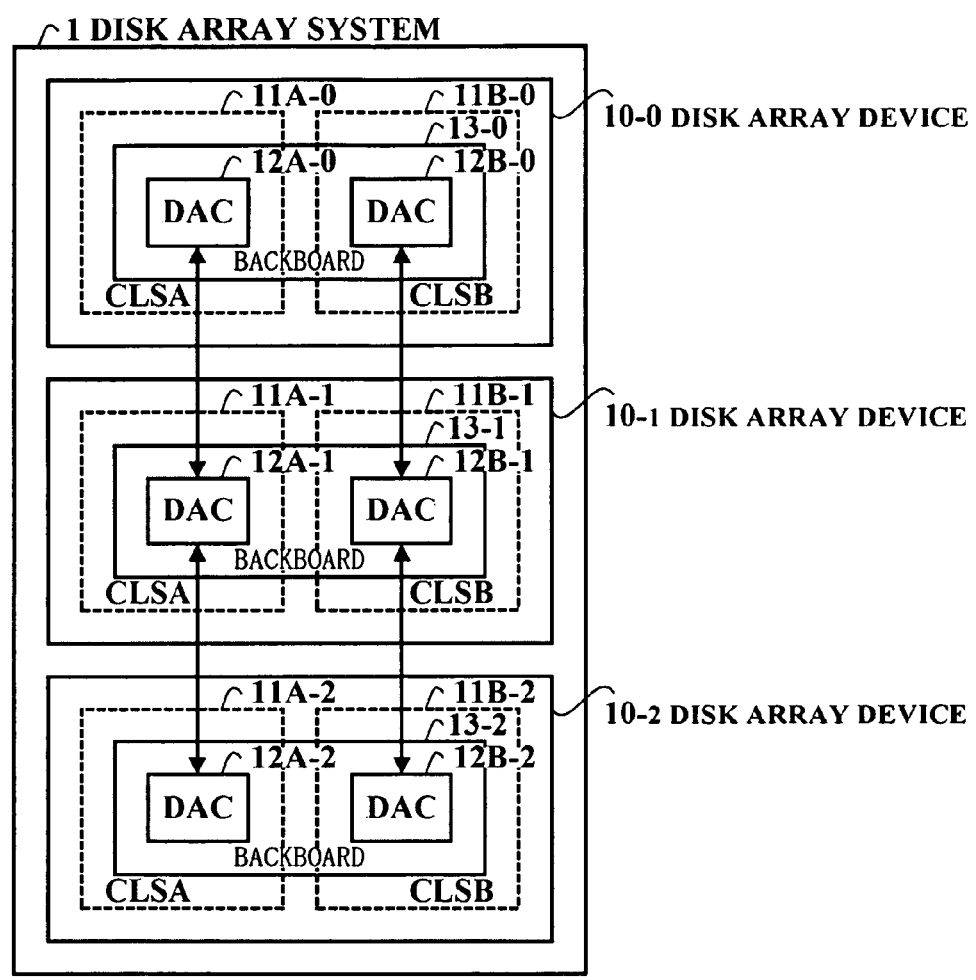
FIG. 2 is a block diagram showing the configuration example (No. 2) of a disk array system according to an embodiment of the present invention.

The disk array system 1 shown in FIG. 2 comprises three disk array devices 10-0 to 10-2. In this case, a DAC 12A-0 and a DAC 12B-0 are connected together via a backboard 13-0 so as to mutually communicate with each other. Moreover, a DAC 12A-1 and a DAC 12B-1 are connected together via a backboard 13-1 so as to communicate with each other. Further, a DAC 12A-2 and a DAC 12B-2 are connected together via a backboard 13-2 so as to communicate with each other.

In the disk array system 1 shown in FIG. 2, the DAC 12A-0 and the DAC 12A-1, the DAC 12A-1 and the DAC 12A-2, the DAC 12A-2 and the DAC 12A-0, the DAC 12B-0 and the DAC 12B-1, the DAC 12B-1 and the DAC 12B-2, the DAC 12B-2 and the DAC 12B-0 are respectively connected together via a cable so as to mutually communicate with each other.

Further, in the disk array system 1 shown in FIG. 2, the DAC 12A-1 and the DAC 12B-0, the DAC 12A-2 and the DAC 12B-1, the DAC 12A-0 and the DAC 12B-2 respectively have a RAID 1 redundant configuration.

Accordingly, in the disk array system 1 in FIG. 2, even if either one of the DAC 12A-1 or the DAC 12B-0 becomes inoperative, no interruption for operating the system occurs. Likewise, even if either one of the DAC 12A-2 or the DAC 12B-1 becomes inoperative, or either one of the DAC 12A-0 or the DAC 12B-2 becomes inoperative, no interruption for operating the system occurs.

In the disk array system 1 in FIG. 2, when, for example, the disk array device 10-1 is replaced, both DAC 12A-1 and DAC 12B-1 become inoperative. However, if both DAC 12B-0 and DAC 12A-2 are operative, no interruption for operating the disk array system 1 occurs.

That is, when the disk array device 10-0 and a disk array device 10-2 are operative, it is possible to replace the disk array device 10-1 without terminating the operation of the disk array system 1.

Next, an explanation will be given of the operation of the disk array system 1 having the foregoing structure with reference to FIGS. 3 to 5.

Figure 3:
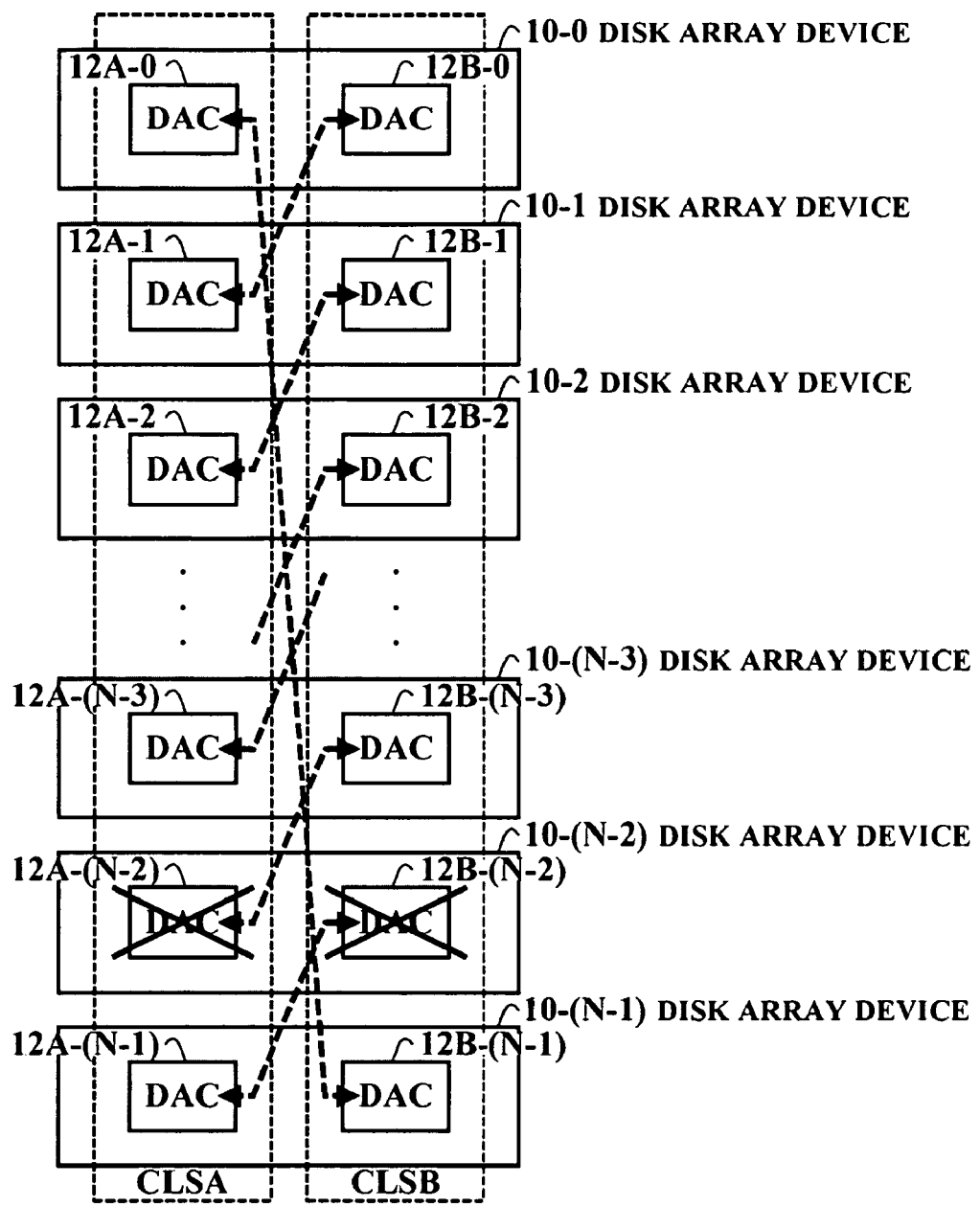
FIG. 3 is a block diagram for explaining a redundant configuration in the disk array system shown in FIG. 1.
Figure 4:
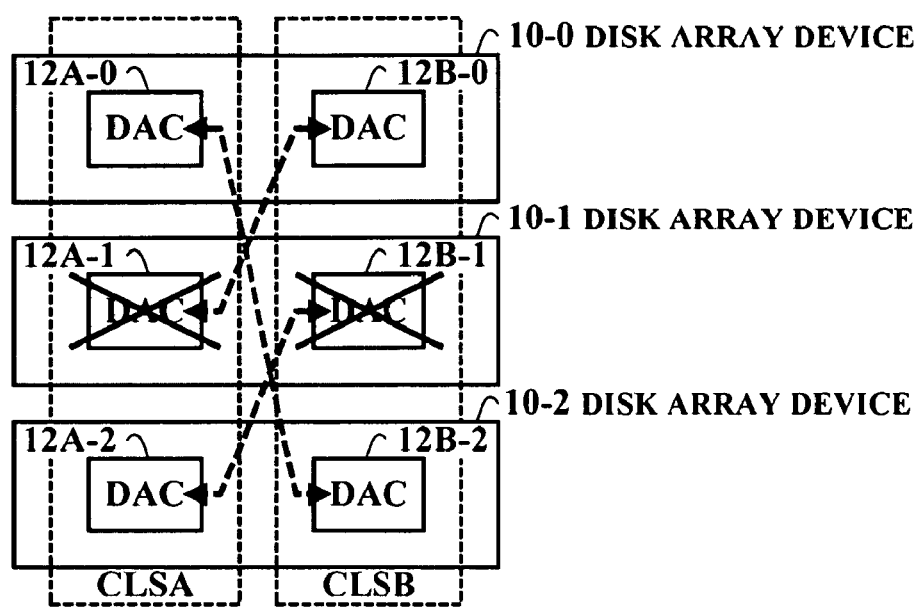
FIG. 4 is a block diagram for explaining a redundant configuration in the disk array system shown in FIG. 2.
Figure 5:
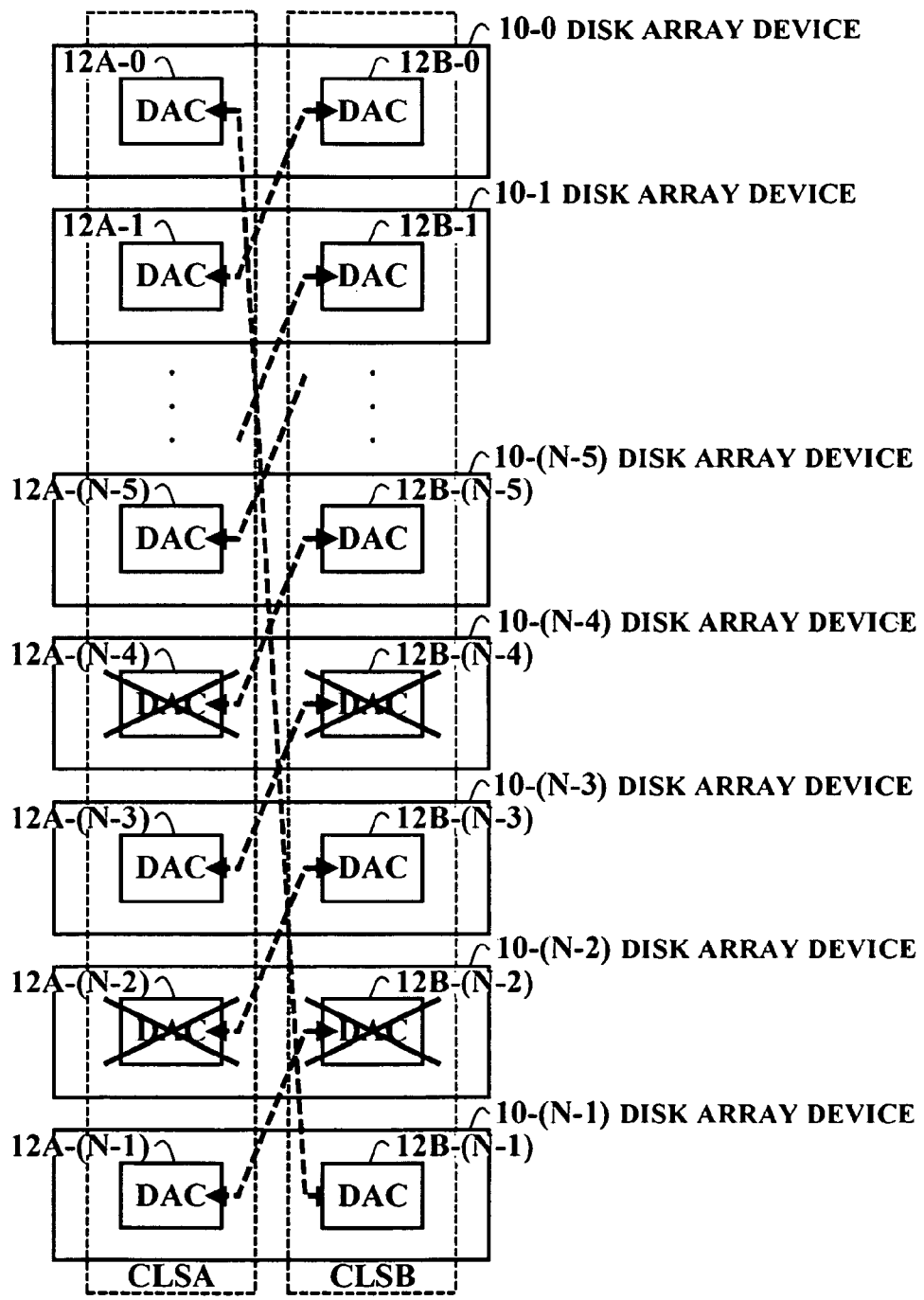
FIG. 5 is a block diagram for explaining a case where two disk array devices must be replaced.
Figure 6:
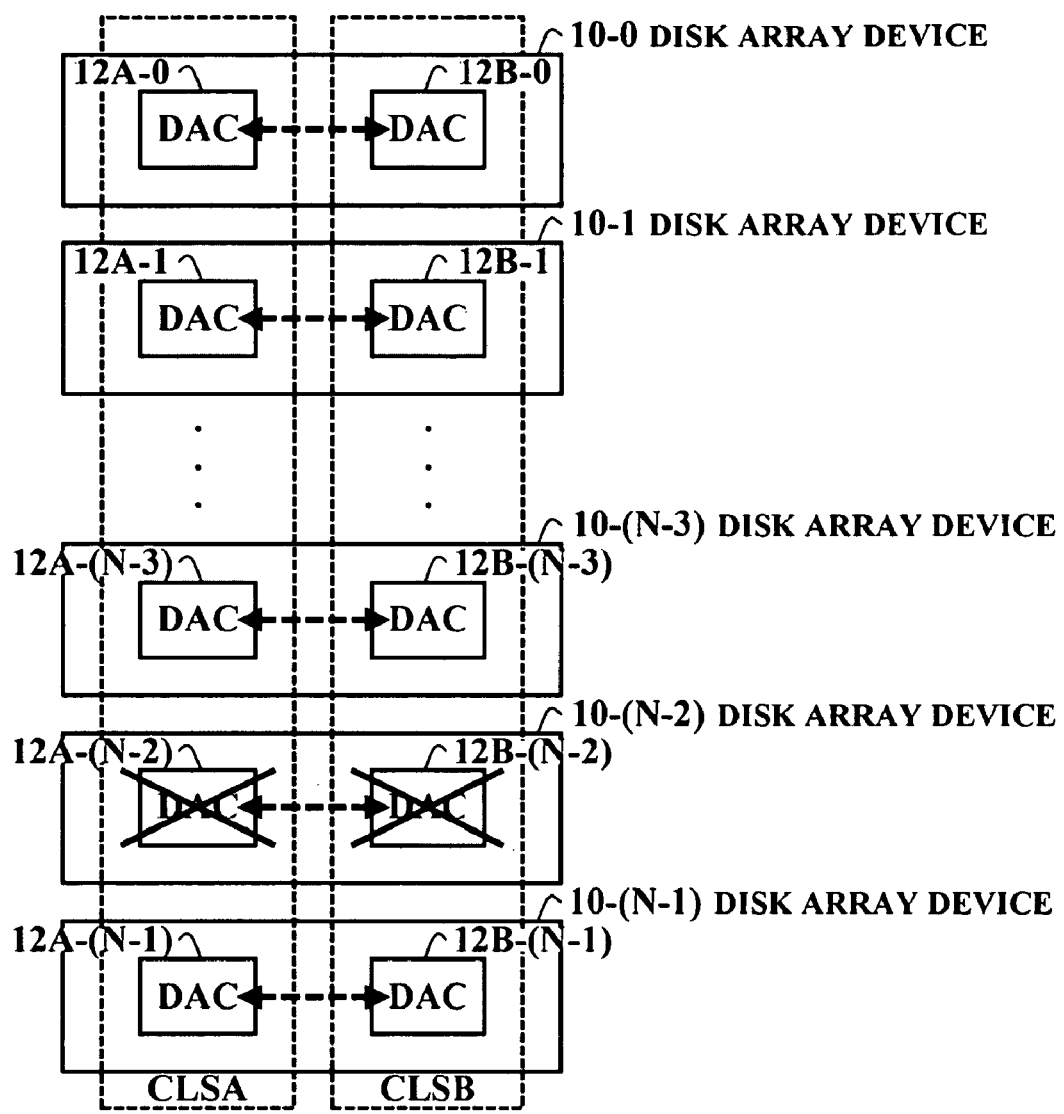
FIG. 6 is a block diagram for explaining a redundant configuration in a conventional disk array system.

Note that in FIGS. 3 to 5, a dashed arrow indicates that a DAC 12A and a DAC 12B interconnected together with the arrow have a RAID 1 redundant configuration.

First, an explanation will be given of an example case where in a backboard 13 of a disk array device 10, there is a short circuit between a power source and a ground, and between signal lines and a failure occurs, so that both DAC 12A and DAC 12B in the disk array device 10 become inoperative.

In the example shown in FIG. 3, the disk array system 1 has N number of disk array devices 10, and the backboard of a disk array device 10-(N−2) becomes defective, so that a DAC 12A-(N−2) and a DAC 12B-(N−2) become inoperative.

In this case, even if the DAC 12A-(N−2) becomes inoperative, as a DAC 12B-(N−3) which is a partner of the redundant configuration is operative, the function as the DAC is maintained. Moreover, even if the DAC 12B-(N−2) becomes inoperative, as a DAC 12A-(N−1) which is a partner of the redundant configuration is operative, the function as the DAC is maintained. Therefore, it is possible to suppress any termination of the operation of the disk array system 1.

In the example shown in FIG. 4, the disk array system 1 has three disk array devices 10-0 to 10-2, and the backboard of the disk array device 10-1 becomes defective, so that a DAC 12A-1 and a DAC 12B-1 become inoperative.

In this case, even if the DAC 12A-1 is inoperative, as a DAC 12B-0 which is a partner of the redundant configuration is operative, the function as the DAC is maintained. Moreover, even if the DAC 12B-1 is inoperative, as a DAC 12A-2 which is a partner of the redundant configuration is operative, the function as the DAC is maintained. Therefore, it is possible to suppress any termination of the operation of the disk array system 1.

Next, an explanation will be given of a case where, for example, two different disk array devices 10 have some problems, and both DAC 12A and DAC 12B become inoperative in each disk array device 10.

In the example shown in FIG. 5, the disk array system 1 has N number of disk array devices 10, and the backboard of a disk array device 10-(N−2) becomes defective, so that a DAC 12A-(N−2) and a DAC 12B-(N−2) become inoperative. Moreover, in a disk array device 10-(N−4), due to replacement of a casing (e.g., due to an air flow trouble or addition of a new mechanism like switches), a DAC 12A-(N−4) and a DAC 12B-(N−4) become inoperative.

In this case, the DAC 12A-(N−2) and a DAC 12B-(N−3) have a redundant configuration, and the DAC 12B-(N−2) and a DAC 12A-(N−1) have a redundant configuration. Accordingly, even if the DAC 12A-(N−2) becomes inoperative, merely the DAC 12B-(N−3) can maintain the function as the DAC, and even if the DAC 12B-(N−2) becomes inoperative, merely the DAC 12A-(N−1) can maintain the function as the DAC.

Moreover, the DAC 12A-(N−4) and a DAC 12B-(N−5) have a redundant configuration, and the DAC 12B-(N−4) and a DAC 12A-(N−3) have a redundant configuration. Accordingly, even if the DAC 12A-(N−4) becomes inoperative, merely the DAC 12B-(N−5) can maintain the function as the DAC, and even if the DAC 12B-(N−4) becomes inoperative, merely the DAC 12A-(N−3) can maintain the function as the DAC.

As a result, even if the DAC 12A-(N−2) and DAC 12B-(N−2) of the disk array device 10-(N−2) and the DAC 12A-(N−4) and DAC 12B-(N−4) of the disk array device 10-(N−4) become inoperative, it is possible to replace both disk array device 10-(N−4) and disk array device 10-(N−2) simultaneously without terminating the operation of the disk array system 1.

As explained above, the disk array system 1 of the embodiment has plural number of disk array devices 10, and each disk array device 10 has two DACs (DAC 12A and DAC 12B). In each disk array device 10, a DAC 12A and a DAC 12B do not have a redundant configuration, each of which has a RAID 1 redundant configuration with a DAC 12B or a DAC 12A of another disk array device.

Accordingly, when a disk array device 10 is replaced because of a failure or the like, the DAC 12A and the DAC 12B of such a disk array device 10 become inoperative, but as the DAC 12B or the DAC 12A which is a partner of the redundant configuration is operative, the function as the DAC is maintained.

Therefore, it is possible to replace a disk array device 10 or the backboard thereof without terminating the operation of the disk array system 1.

Moreover, in plural disk array devices 10, even if a DAC 12A and a DAC 12B become inoperative, as far as a DAC 12B and a DAC 12A which are respective partners of redundant configurations are operative, the function of the DAC is maintained, so that no interruption for operating the disk array system 1 occurs. Accordingly, if a DAC which is a partner of the redundant configuration is in normal operation, it is possible to replace plural disk array devices 10 and plural backboards simultaneously.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A disk array system comprising a plurality of disk array devices each having plural disk array controllers for controlling writing and reading of data to plural disk devices constituting a disk array, wherein
    a first disk array device in the plurality of disk array devices has a first disk array controller, and a second disk array controller connected to the first disk array controller so as to communicate with each other via a first backboard;
    a second disk array device different from the first disk array device has a third disk array controller, and a fourth disk array controller connected to the third disk array controller so as to communicate with each other via a second backboard different from the first backboard;
    the first disk array controller is connected to the third disk array controller so as to communicate with each other via a cable;
    the second disk array controller is connected to the fourth disk array controller so as to communicate with each other via a cable;
    the second disk array controller and the third disk array controller have a redundant configuration;
    when there is another disk controller array controller, which is connected to each of the first and fourth disk array controllers so as to communicate with each other, other than the second and third disk array controllers, each of the first and fourth disk array controllers is connected to three disk array controllers so as to communicate with one another, and has a redundant configuration with a disk array controller other than the second and third disk array controllers; and
    when there is no other disk array controller, which is connected to each of the first and fourth disk array controllers so as to communicate with each other, other than the second and third disk array controllers, each of the first and fourth disk array controllers has a redundant configuration with a disk array controller connected to merely two disk array controllers so as to communicate with one another.

2. A disk array system comprising a plurality of disk array devices each having two disk array controllers for controlling a disk array, wherein
    each of the disk array devices has a first disk array controller, and a second disk array controller connected to the first disk array controller so as to communicate with each other via a backboard;
    each of the first and second disk array controllers has two ports for connecting cables, and is connected to a first or a second disk array controller of at least one other disk array device so as to communicate with the first or the second disk array controller via the cable using at least one port;
    the second disk array controller of each disk array device other than a terminator disk array device in the plurality of disk array devices has a redundant configuration with the first disk array controller of a disk array device right under that disk array device;
    the first disk array controller of a front-line disk array device has a redundant configuration with the second disk array controller of the terminator disk array device; and
    each of the disk array devices has a one-to-one correspondence with the backboards.

* * * * *